: US009288459B2

United States Patent
Luizetto Pinto et al.

(10) Patent No.: US 9,288,459 B2
(45) Date of Patent: Mar. 15, 2016

(54) REAL-TIME CORRECTION/CALIBRATION SYSTEM FOR THE COLOR SPECTRUM CONTAINED ON AN IMAGE OUTPUT (TRANSMITTED) FROM AN IMAGE CAPTURE AND OUTPUT MACRO-SYSTEM, ACCORDING TO A PREVIOUSLY DEFINED COLOR SPECTRUM REFERENCE

(71) Applicants: Carlos Francisco Luizetto Pinto, São Paulo (BR); Vanderlei Dawid Barboza, São Paulo (BR)

(72) Inventors: Carlos Francisco Luizetto Pinto, São Paulo (BR); Vanderlei Dawid Barboza, São Paulo (BR)

( * ) Notice: Subject to any disclaimer, the term of this patent is extended or adjusted under 35 U.S.C. 154(b) by 43 days.

(21) Appl. No.: 13/919,472

(22) Filed: Jun. 17, 2013

(65) Prior Publication Data
US 2014/0368692 A1 Dec. 18, 2014

(51) Int. Cl.
*H04N 9/73* (2006.01)
*G01J 3/46* (2006.01)
(52) U.S. Cl.
CPC .. *H04N 9/73* (2013.01); *G01J 3/465* (2013.01)
(58) Field of Classification Search
CPC .................. H04N 9/735; G01J 3/465

USPC ............................................... 348/181, 223.1
See application file for complete search history.

(56) References Cited

U.S. PATENT DOCUMENTS

| | | | |
|---|---|---|---|
| 2003/0081564 A1* | 5/2003 | Chan ............................. | 370/328 |
| 2007/0071314 A1* | 3/2007 | Bhatti et al. .................. | 382/162 |
| 2007/0092135 A1* | 4/2007 | Piirainen ....................... | 382/167 |
| 2012/0050580 A1* | 3/2012 | Iwasaki ..................... | 348/240.99 |
| 2014/0119649 A1* | 5/2014 | Moon et al. .................... | 382/167 |

\* cited by examiner

*Primary Examiner* — Nhan T Tran
*Assistant Examiner* — Chan Nguyen
(74) *Attorney, Agent, or Firm* — Advitam IP, LLC

(57) ABSTRACT

A real-time correction/calibration system for the color spectrum contained on an image output (transmitted) from an image capture and output macro-system is provided. The system uses a reference of previously defined color spectrum, represented by an inventive solution preferentially in the electro-electronic or computing sectors. The invention is particularly useful when applied to "image capture and output macro-systems" which involve the use of equipment such as TV sets, projectors, data show, notebook, netbook, PDA, tablets, mobile telephone apparatus, film and photographic cameras, among others. The system of correction/calibration of color spectrum of an image captured from an object (Ob) and perceived by the observer (Ob) is provided with attributes such as flexibility, portability, agility, automation, low labor cost and economically viable.

7 Claims, 4 Drawing Sheets

REAL-TIME CORRECTION/CALIBRATION SYSTEM FOR THE COLOR SPECTRUM CONTAINED ON AN IMAGE OUTPUT (TRANSMITTED) FROM AN IMAGE CAPTURE AND OUTPUT MACRO-SYSTEM, ACCORDING TO A PREVIOUSLY DEFINED COLOR SPECTRUM REFERENCE

FIELD OF THE INVENTION

The present invention concerns a solution which benefits all the industries and/or services fields that manufacture and market products that have an image capture and output. The products can have a macro-system, in local or remote form, and of a static or dynamic nature, providing to the observer a sensorial capacity of an "indirect vision", that will be duly explained in the technique bases noted below.

More particularly the present invention provides for an image capture or output devices, such as: monitors, TV sets, projectors, data show equipment, notebook, netbook, PDA, tablets, mobile telephone apparatus, gps devices, film and photographic cameras and printers, among others, the list not being limiting, an appropriate system and method for reproducing exact colors.

BACKGROUND OF THE INVENTION

Need for the Invention

Considering the previously defined wide application field noted above and considering the large commercial penetration of electro-electronic devices having on-board "image capture and output macro-system", it is possible to divide the invention into:

1. the technologic view: more precisely the invention in the form of a "real-time correction/calibration system for the color spectrum of an output (transmitted) image" is particularly useful in an equipment that requires differentiated or perfect fidelity of the color spectrum of an output image when perceived by the human view regarding a previously defined color spectrum as a comparison paradigm.

2. the final user view: as a complement to equipment that requires differentiated or perfect fidelity of the color spectrum of output images, there is a latent necessity that the intervening activity, for regulating the issued color spectrum, should be provided with an ergonomic characteristic, such that the ideal operating condition may be translated in the form of a real-time "regulation/calibration" and that it will be realized preferentially in automatic form, minimizing the human intervention.

It will be understood by persons having ordinary skill in the art that the automated operation of the present invention, for "calibrating/regulating" the issued color spectrum, must be provided with full reliability, being allowed to the final user some intervention grade to this desired automated procedure, applicable in cases of extreme technical necessity.

Finally, and as a consequence of the advantages provided by the highly automated system of the present invention, it will be seen that the calibration/regulation operations of the color spectrum taught herein require labor without large technical specialization in the complex context of the regulating activity itself.

3. the commercial view: as resulting from the necessities determined by the optical and final user views, it is desirable that the system will be cost effective, thereby being feasible without adding largely to the final sale price. In particularly providing to the entrepreneur purchaser a tool of commercial differentiation related to the electro-electronic products established in the market and more importantly related to the calibration/regulation solutions of the color spectrum of an output image anticipated by the state of the art. The latter being the object of description and critical analysis on the topic of "technique bases" below.

Complementing, and considering the commercial differentiation point, it is also an explicit necessity that the system will be provided with "portability", being possible to be specified jointly with new electro-electronic equipment, still at the plant ground, or to be aggregated to the rich portfolio of on-board functions in electro-electronic equipment already supplied to the market, that is, already in use by the final consumer.

4. Application examples: the demand for the present invention is highlighted in the field of photography, movie making and image transmission, static or dynamic (videos), for professional named application, widely used in the making of films, novels, series, where the final quality of the film must reproduce a reality sensation to the viewer/watcher.

In addition it will be noted, by persons having ordinary skill in the art that the present invention also has large relevance in the fields of medical (including dermatology), dental, and aesthetic fields, among other arts, where the fidelity of the image generated by the image capture and output macro-system, and perceived by the human eye, is directly related to the quality and reliability of the final product (or service) achieved, and consequently assuring the customers final satisfaction.

Objects and advantages of the present invention will become apparent as the description proceeds.

SUMMARY OF THE INVENTION

In accordance with the present invention, a novel real-time correction/calibration system for the color spectrum contained on an output (transmitted) image from an image capture and output macro-system is provided. Accordingly in a previously defined color spectrum reference, where devised architecture does not find a parallel related to the known solutions in the state of the art for "correction/calibration" procedures for the color spectrum of an output image, such correction/calibration takes into account the overall characteristics of the involved environments, that is, the localization where the image capture and transmitting actions occur.

In contrast, the present inventive system is novel in that based on the development of a large complexity algorithm in the form of a device a method that take into account an image with color spectrum perceived by the human view with quality and reliability related to a previously defined paradigm of color spectrum, where said calibration/regulation of the captured and output colors filters the distortion demanded by the ambient condition, remarkably the illumination conditions.

Finally, the invention is provided with industrial applicability, being economically feasible and, therefore, fulfilling the severe requirements of patentability, remarkably as an invention patent.

Technique Bases

In order to understand the present invention, and for understanding the state of the art an explanation is provided on the state of the art of static and/or dynamic image capture and output systems, as well as the commonly used solutions in the sense for correcting distortion in the gradient and spectrum of colors output and perceived by the human eye. It will be possible to identify the limiting aspects and therefore the necessities of the "real-time correction/regulation system for the color spectrum contained in an output image" of the present invention.

a. About the vision sense: specifically for the human eye (which is a vision sensorial organ), science teaches that we are provided with three color receptors, to with green, blue and red receptors, technically known by the acronym "RGB" (Red, Green, and Blue). Persons having ordinary skill in the art will recognize that these are the colors defined as the "primary" colors and the combinations thereof is what defines how the human being sees the world in the colored form. Further these colors are outputted by the object viewed in the form of light beams (or reflected light), such that each color individually is comprehended as a determined light wavelength.

a.1 Disarmed vision: also known by the term "to the naked eye", comprises the direct perception of the human eye of a determined object, a determined landscape, etc. where the human eye receives, without any type of distortion, the spectrum of the colors contained in or reflected from the viewed object. In this sense it is possible to assert that when the observer looks at an object provided with a determined "RGB" color composition, the observer's sensorial system (brain) will interpret the colors perfectly.

a.2 Armed vision: in this scenario, in order to maximize the human vision capacity the eyes are armed with optical instruments such as microscopes (optical and electronic) that magnify the vision in a way to allow us to see very small bodies which are impossible to be seen by the naked eye.

By making use of optical instruments, it is possible to say that the vision perception is also realized in direct form, that is, directly applied to the eyes of the observer, which also results in a fidelity in the perception of the "RGB" color composition having as a paradigm the original output of the "RGB" color composition by the object in observation.

a.3 Indirect vision: in this case the observer has the perception of an image making use of image transmitting equipment which has on-board technology that allows capture and output/transmission of the captured images of an object or scene observed therewith. Within this context it will be understood that this is most often understood as a television device. The teletransmission is the technology and the TV set is the device which allows us to capture and see the images that are being transmitted by the TV broadcasting companies.

In contemporary times it is relevant to bring to light a short understanding of "digital technology", anchored in equipment such as computers and correlated ones, consolidating in a vertiginous way the concept of "digital vision", that allows one to visualize in real-time "images" which are being captured in distant places at any location where there is installed other computers equipped with peripheral equipment such as a webcam and "monitor" for capturing and outputting images for other computers respectively connected to the computer networks.

b. About the invention paradigm: according to what was mentioned above in the topic "Application Field" the inventor selects in the "sense of vision" the technology defined as "indirect vision", which will be object of critical analysis on the development of the next pages, and complementing the paradigm of the critical analysis it is exclusively focused on the "color perception" item by a remote observer, or an observer which makes use of equipment provided with an image capture and output macro-system.

c. Identification of the macro-problem: while the use of "indirect vision" is largely diffused, where it deserves to be mentioned the "digital vision", was followed by the digital revolution, the critical analysis of the final achieved result, that is from the "visual perception" of the observer related to the output/transmitted image, and more specifically having as a paradigm the fidelity of the perceived RGB color combination related to the RGB color composition output by the object (landscape, scenario, products, etc.), it is revealing that there is a large distortion in this named "visual perception" of the observer. In a remissive way the image color composition perceived through the output/transmission equipment is distinct from that one perceived through the direct view of the observer to the object.

Aiming to consolidate the understanding of the stated macro-problem, practical examples, on which the visual perception of the perceived RGB colors is "distinct" from that one effectively output by the physical object, are now provided.

c.1 Commercial exposure of video devices: It will be understood by persons having ordinary skill in the art that the displays of a plurality of TVs, monitors, video games, base displays, film cameras, among others, from different manufacturers, will show differently even for the identical image. Although the image as provided has the same definition and sharpness, when observed though the video output of any of the various devices an observer will see the image in a different color spectra for each device; this is an occurrence even where the various pieces of equipment come from the same manufacturer.

In tests of this condition the following questioning is given to the observer:

Which of the images (digital or not) represent with fidelity the true RGB color composition of the physical object of which image was captured?

It is evident that for such question there is no concrete answer, because the information on the real RGB color composition of the physical object (product, scenario, landscape) is not registered by the image capturing and output equipment/device. Although this is an effective example, it is possible to bring to the light the questioning about the real necessity that such fidelity of the RGB color composition of the physical object will be actually put on board of image output and transmission equipment. Thus examples of equipment of this nature, wherein the fidelity of the RGB color composition of the physical object is in fact mandatory are provided.

c.2 Procedures in the expertness sector: As an example, consider as a reference the reproduction of an artistic painting, such as from the impressionist Van Gogh. The reproduction of this painting by means of image output/transmission equipment, results in the concrete fact that the colors painted by the artist can never truly be reproduced by the display of the equipment.

So it is conclusive that in this case the use of equipment of this nature to confirm the veracity of an art work does not apply when used to make a remote analysis, because it does not allow to the expert professional, among other things, a trustworthy observation of the complex world of colors of the painting, thereby, compromising then the final verdict about its veracity or not.

c.3 Procedures at the health field: the use of video equipment in the form of, for example, a camera-pen is nowadays very common. For example where the dentist registers and documents an image (dynamic for showing to the patient, and static for sending to the maker of prosthetics) of the teeth, in order that said register should have the trustworthy visual information of the color of the teeth which can be the object of some sort of treatment, or prosthetic part manufacturing.

Having in mind that the manufacturing of prosthetic parts relies on the correct definition of the color of the tooth to be manufactured or repaired, the present invention identifies the need that the use of this prior art image capture and output technology for the tooth, does not fulfill its function with the necessary degree of excellence, as invariably the dentist when receiving the completed prosthetic part will verify the high distortion grade of its RGB color composition related to the RGB color composition of the natural tooth (or neighboring teeth) of the patient.

In such cases it is of fundamental importance to the accuracy of the dentist professional in defining the ideal RGB color pattern, to make use of a color table, such as specific pantones for the dental field; however, such physical tables or cards are subjected to the natural degradation by the exposure to the environment and time causing the colors thereon to show untrue.

As consequence of the lack of fidelity of the RGB color card, errors are made regarding the color of the natural tooth that is being replaced or perhaps capped. It is common then that the dental lab manufacturing the prosthetic part will produce a prosthetic device wherein the coloring could be many times a significant deviation to the previously defined color pattern; which in general leads to the disapproval of the part both by the dentist and the patient, adding costs to the manufactured final product.

In analogous form it is possible to make use of the same logic for demands on surgical procedures as the precision and success of such are directly related to the quality and fidelity of the RGB color set of the perceived image by the surgical professional.

c.4 Creation of advertising pieces: for advertising companies, which work with the creation of printed or electronic media, there exists the necessity that all products manufactured by them will follow a unique color pattern. For example, this can be provided by a pantone, which provides high fidelity colors standardized for electronic displays and printing performed on printers (generally of wax sublimation, inkjet or laser with toner).

Nevertheless it is common to observe high distortion of the RGB color set of the advertising piece produced with applicable software (such as Photoshop® and similar applications), that is, the colors of the image shown at the monitor do not represent the color pattern defined for this image when treated at the applicable software; oftentimes such discrepancies are perceived only at the time of printing the advertising piece.

This condition can force the creation team to remake, often several times, the piece, needing to adjust the RGB color set until the correct resolution is achieved. This typically causes the expenditure of additional specialized labor cost as well as printing inputs and the waste of materials and time.

d. Solutions for calibrating the color spectrum: although the distortion macro-problem of the RGB color set perceived by the human eye, through a monitor, of an image capture and output equipment is known, there are adopted solutions which aim to correct the distortion. The art shows means of regulation/calibration the acknowledged discrepancy, in order that this equipment starts to output images with the same RGB color set naturally output by the physical object (products, scenarios, landscapes, etc.). Such means is discussed herein and below.

e. Resources for performing the conventional color calibration: persons having ordinary skill in the art will understand that it is mandatory that a specific equipment for the calibration procedure will be used besides the equipment to be calibrated itself and that such will be done by a professional expert with certification for both said equipment. Also in the majority of the cases, the specialized technicians prefer to certify and handle the equipment which will receive the color calibration in rooms with rigid conditions. However, this causes the calibration to be valid only for the same conditions and not for general use. This calibration is not warranted for fidelity when the device is under different conditions. That is, the equipment calibration is only valid for the conditions where it originally is, when removed therefrom the device will be different from the original one as the new local conditions and therefore concomitant new distortions will occur both on the color capture and output.

In addition, when it is mandatory that the calibration will occur at a determined local condition, such as a room of a medical office, generally the technicians will require the installation of blocking windows for external light and individualization lamps, including lamps which have color deposition and temperature, as well as their power signature rigidly defined leading invariably to the undesired interference on the local condition indigenous aesthetic/decor and furniture and object arrangement.

Another restrictive aspect lies in the fact that many image capture and output equipment types, in order for them to receive the connection of the specific calibration equipment, require the opening and exposure of the internal boards, the internal handling of switches, jumpers and potentiometers. That is a complex procedure typically only performed by professionals highly specialized in color calibration operations.

Another remarkable characteristic of solutions for calibrating colors in image capture and output equipment lies in the fact that each one is specific for a type of equipment. They are not universal named solutions and therefore generate a complicating factor in the sense that the color calibration activity requires high grade of specialization. Within this scope then, the calibration equipment for each type of image capture and output equipment is manufactured in small scale, causing high industrial cost.

Another negative aspect to be considered lies in the fact that the large majority of the calibration systems of the prior art are not adaptable for calibrating standard equipment, including almost all of the equipment including but not limited to monitors, TV sets (namely, LED, LCD PLASMA, OLED, CATHODE RAY TUBES (CRT) etc, and projectors and Data Show Equipments presently on the market), and PLASMA.

Finally, in situations where the remote output of a captured image exists, such as when a dentist sends a picture of teeth to the prosthetic creation professional, so that the latter perceives with fidelity the RGB color combination of the received image, it is mandatory for fidelity that both the dentist and the prosthetic creation professional have the same type of monitors, preferentially of the same manufacturer and as well that the calibration of the equipment is performed by the same calibration company (with the same calibration equipment and procedures), in both controlled rooms (of the dentist's and of the prosthetic's) and yet with the periodic checks and adjustments at least every six months, most particularly when the devices are in different cities, thus imposing a very high cost for the calibration service itself.

It should be kept in mind that during the color calibration procedure use of the equipment must be halted, thus precluding the completion of projects. It has been found that this is particularly pertinent to advertising company's, where creation of works can be paralyzed for a long period.

In the implementation of color calibration systems known in the state of the art, U.S. Pat. No. 8,159,503 entitled "METHOD FOR ADJUSTING BRIGHTNESS, CONTRAST AND COLOR IN A DISPLAYING APPARATUS", is pertinent. Devices and methods made in accordance with the teachings of the '503 patent allow the user to calibrate the brightness and colors of images output in a determined display of a monitor. The patent includes control in a system that compares the color that is being output with a previously defined pattern for this same color such that the user can manually adjust the output color created to match the reference color.

This is an example typically applied on TV sets, where a critical analysis thereof reveals that although an adjustment of the output color related to the standard color exists, the same does not take into account the distortions generated by the general conditions of the environment where the apparatus is operational (such as in an exposition center). This patent therefore does not solve the problem of perceiving the real colors of the captured object in certain conditions.

Prior art means and methods related to performing the color calibrations, considering the general condition of the locations where the apparatus is deployed and operated, are devised in the form of a complex systems The architecture of these complex systems imposes a long set up time of the desired conditions where the equipment will be calibrated in its color output, and yet the achieved calibration is only trustworthy for the identical conditions where the equipment is deployed, thus losing the fidelity when the conditions are changed.

SOME OBJECTS OF THE INVENTION a. Paradigm of the Invention Development

Considering what is noted above, it is one of the main objects of the present invention to match the colors of an image with the colors of an original object. With this invention, it is feasible to observe an image (static or dynamic) of an object (product, landscape, scenario) created by means of a camera or other means (defined as "indirect vision"), wherein the RGB color set, perceived by the observer, will be identical to the RGB color set naturally output by the object (defined as "direct vision" or "disarmed"). The use of the invention will thus eliminate all sort of distortion typically observed in an image capture and output equipment. It will be understood, by the study of the present invention as disclosed herein, that in order for this to be feasible the invention discloses a "real-time" (or not) correction/calibration system for the color spectrum contained on an image output (transmitted) from an image capture and output macro-system. The system is applied according to a previously defined "color spectrum reference" differentiated by taking into account the ambient conditions in which the apparatus and object are located, without consideration to the suitability of the ambient conditions for the effective calibration consolidation disclosed.

b. Predicates of the system: the referred "real-time correction/calibration system for the color spectrum" is differentiated from the techniques of calibration solutions of this nature, due to the following aspects:

flexibility: because its architecture allows that the system will be applicable to all sorts of equipment, inclusively of different manufacturers of image capture and output equipment;

portability: because the inventive calibration system can be operational in the working conditions of the professional itself, since the system takes into account the characteristic variations of each working environment in the color calibration, creating very close to the natural color. In other words, no intervention in the environmental condition is necessary for consolidating the color calibration;

economically viable: because to be operational the same can be deployed on board of its hardware and software architecture with low industrial cost, reducing acquisition and service costs;

automated: where the calibration is performed by means of a routine of an application software, specific for this end of RGB color composition calibration, received by the image capture and output equipment. It must be added that the automation contemplates the possibility of a standard scheme or else a punctual scheme when determining color gradient, to the taste of the final user;

reduced labor cost: since it does not require the use of specialized labor, as the system operator can provide the input of digitalized data of a determined color reference (captured from a physical part, such as pantones);

agility: where the calibration operation is performed in real-time, that is, the adjustment is instantaneous, the image capture steps and output equipment regime can remain functional and operational 100% of the time. In this way, therefore, there is no compromise to the throughput of determined activities, which is particularly apropos to, for example, an advertisement agency. Moreover this calibration in real-time can be automatically performed when changing the general condition of the environment where the apparatus is installed and/or operational.

b. Architecture of the system: as can be verified by the predicates of the "real-time correction/calibration system for the color spectrum" this is highly differentiated from the state of the art solutions for color calibrating, where the system itself is founded on the following elements:

b1. A physical reference: that can be a color table that contains the following information: manufacturer, reference type, manufacturing date of the physical part: in order to allow for checking the reference validity, quantity of table items, maximum time for calculating the items and the desired accuracy value, which will be less than the "adjustment band" quantity.

In a preferred embodiment, the information can be stored in automated form, using technology such as bar codes, RFid, NFC, and Bluetooth among others, as will be understood by persons having ordinary skill in the art.

Previously, the color table, in the form of for example a pantone, must have equivalency in digital means (with its reference values, adjustment band and color description, which will be part of the reference set) that can be stored and transported in electronic data media, such as CD, flash memory, magnetic memory, etc., or else the file be downloaded directly by the calibration system hardware.

b.2 Physical reference reading device: which has as its function the capture of all the information relative to the color physical reference for delivery to the applicable software. The software then is responsible for color treating and calibrating. In a preferred embodiment this device can be any type of reading sensor device such as bar codes, RFid devices, NFC devices, and Bluetooth devices among others;

b.3 Image capturing device: devices such as a camera (photographic or video), or color recognizing sensor such as those compatible with the wavelength generation or achievement for a certified valid position of RGB colors, or other which causes part of the image capture and output equipment itself to be calibrated;

b.4 Hardware support: has the function of providing the operational (running) condition of the applicable software for automatic calibration of the RGB color combination present in an image captured by any manner of capture equipment, such as a camera;

b.5 Applicable software: has the function of providing the correction of the full RGB color spectrum, where a routine is performed for correcting the color perceived, having as color reference the previously stored reference color charged in the system by means of a digital media; and b.6 Image output device: such as video monitors, having on board any type of technology (plasma, LED, CRT, among others), with the function to output an image with RGB color composition dully calibrated according to the physical or digital reference.

A more detailed explanation of the invention is provided in the following description and claims and is illustrated in the accompanying drawings.

DESCRIPTION OF THE DRAWINGS

In order to complement the present description of the invention and for achieving a better understanding of its distinctive characteristics, attached is a set of drawings in the form of block diagram and flow chart of a color calibration routine, in a preferred embodiment, of the "real-time correction/calibration system for the color spectrum contained on an image output (transmitted) from an image capture and output macro-system, according to a previously defined color spectrum", where.

DETAILED DESCRIPTION OF THE ILLUSTRATIVE EMBODIMENT

Figure 1:
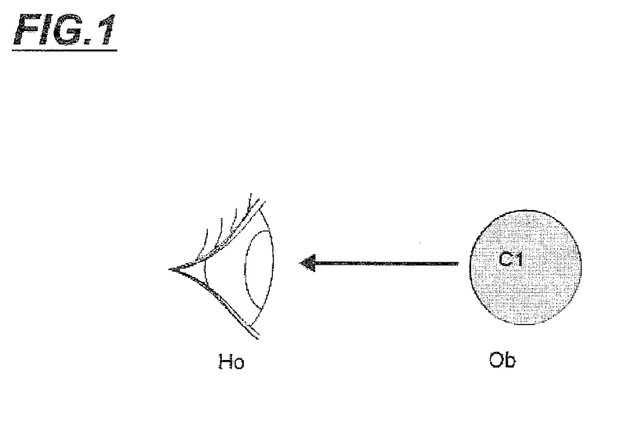
FIG. 1 is an illustrative depiction of the form of a natural capture of image and image colors, highlighting the "direct or disarmed vision" mode.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

a. About the color perception by direct vision: FIG. 1, is a depiction of the "direct vision" mode, where an observer (Ho) focuses his/her view to an object (Ob) which outputs a specific RGB color combination, named "natural combination" (C1). It will be understood that in this condition the observer (Ho) exactly perceives this natural combination (C1), without any type of distortion. This is, therefore, considered the ideal and most trustworthy condition of color perception, that is, the closest possible perception to reality.

Figure 2:
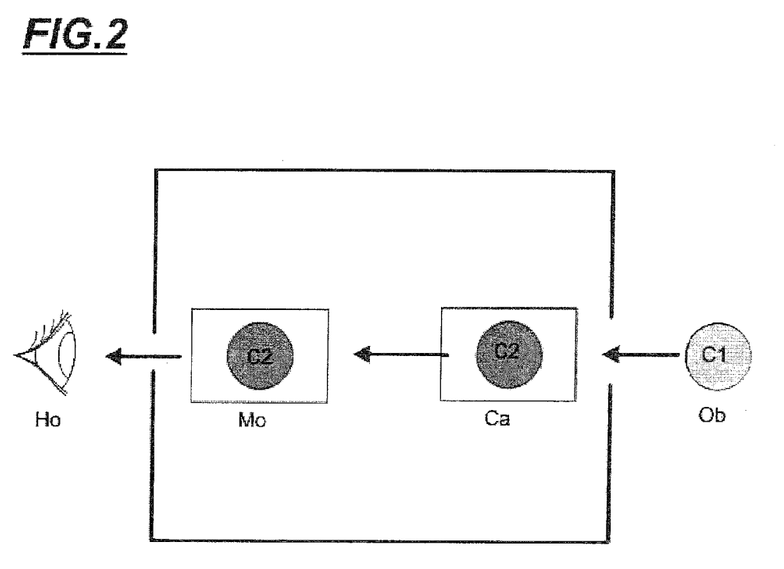
FIG. 2 is an illustrative depiction in the faun of a block diagram of the indirect capturing method of image and image colors, in the "indirect vision" mode, performed by means of equipment provided with image capture and/or output macro-system, highlighting the distortion of the RGB color composition.
Figure 3:
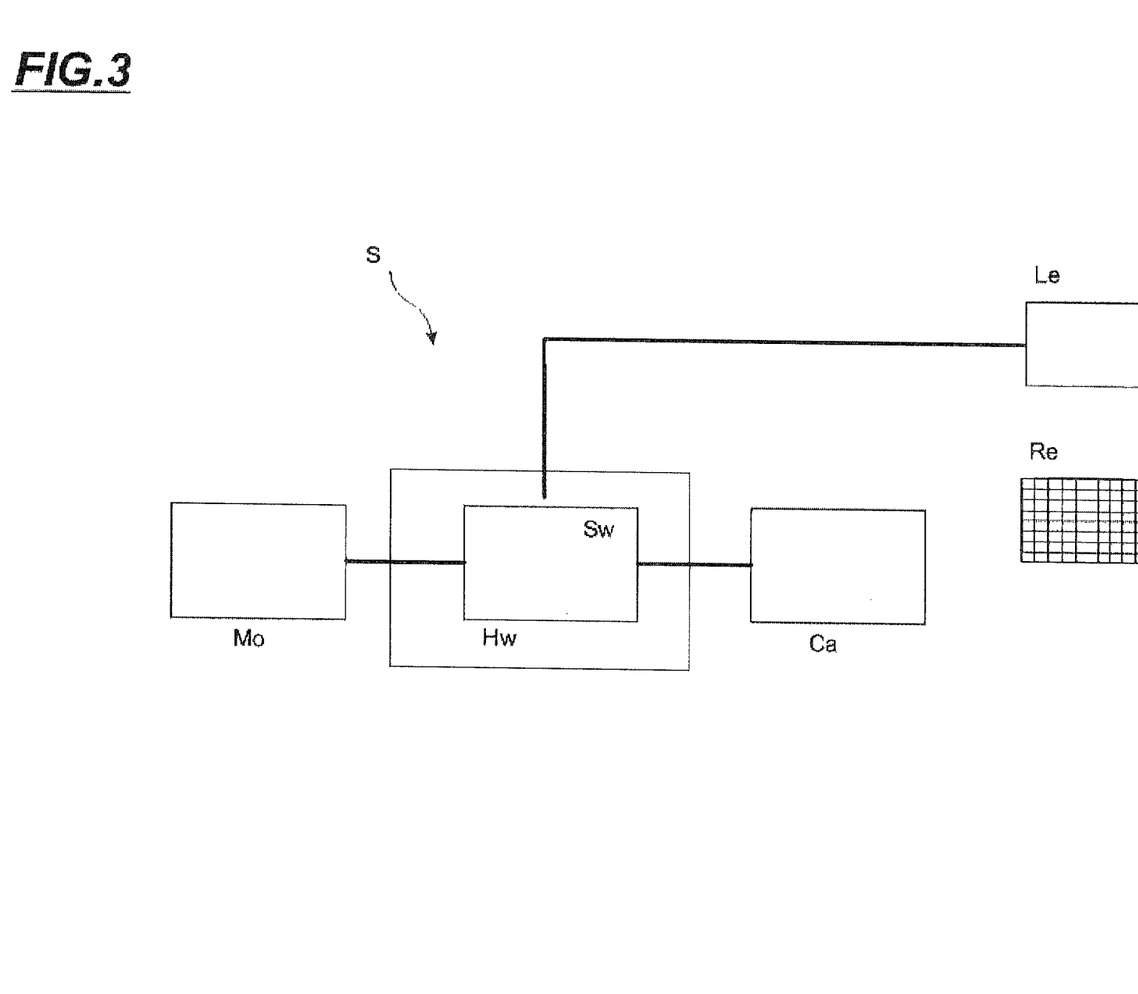
FIG. 3 is a depiction in the form of a block diagram of the macro-architecture of the "real-time correction/calibration system for the color spectrum contained on an image output (transmitted)", highlighting its functional blocks.
Figure 4:
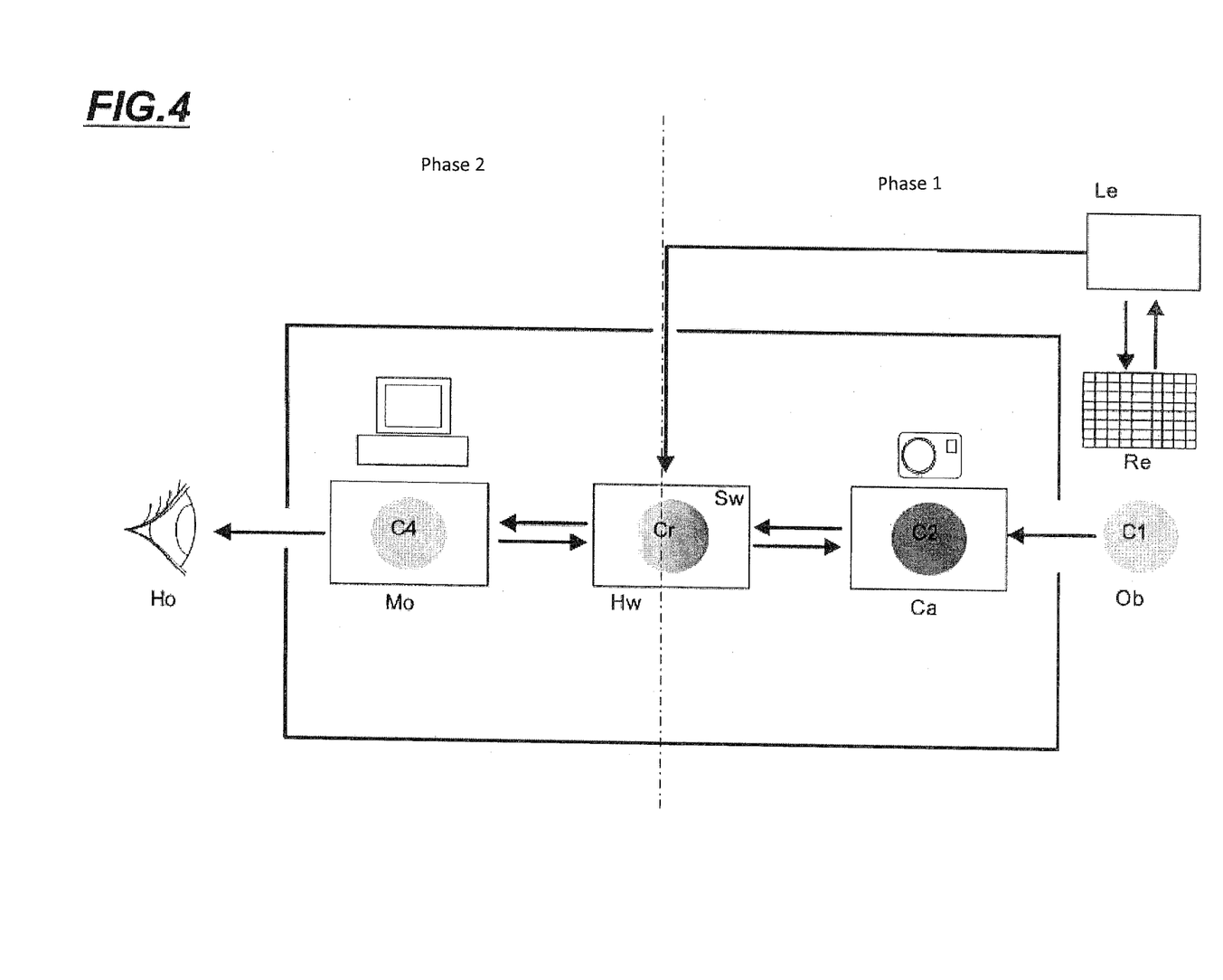
FIG. 4 is a depiction in the form of a block diagram of the method for indirect capturing image and image colors, in the "indirect vision" mode, performed by means of equipment provided with image capture and/or output macro-system, with the introduction of the "real-time correction/calibration system for the color spectrum contained on an image output (transmitted)", highlighting the fidelity of the RGB color composition output related to the RGB color composition naturally output by the object (products, scenario, landscape, etc.)
Figure 5:
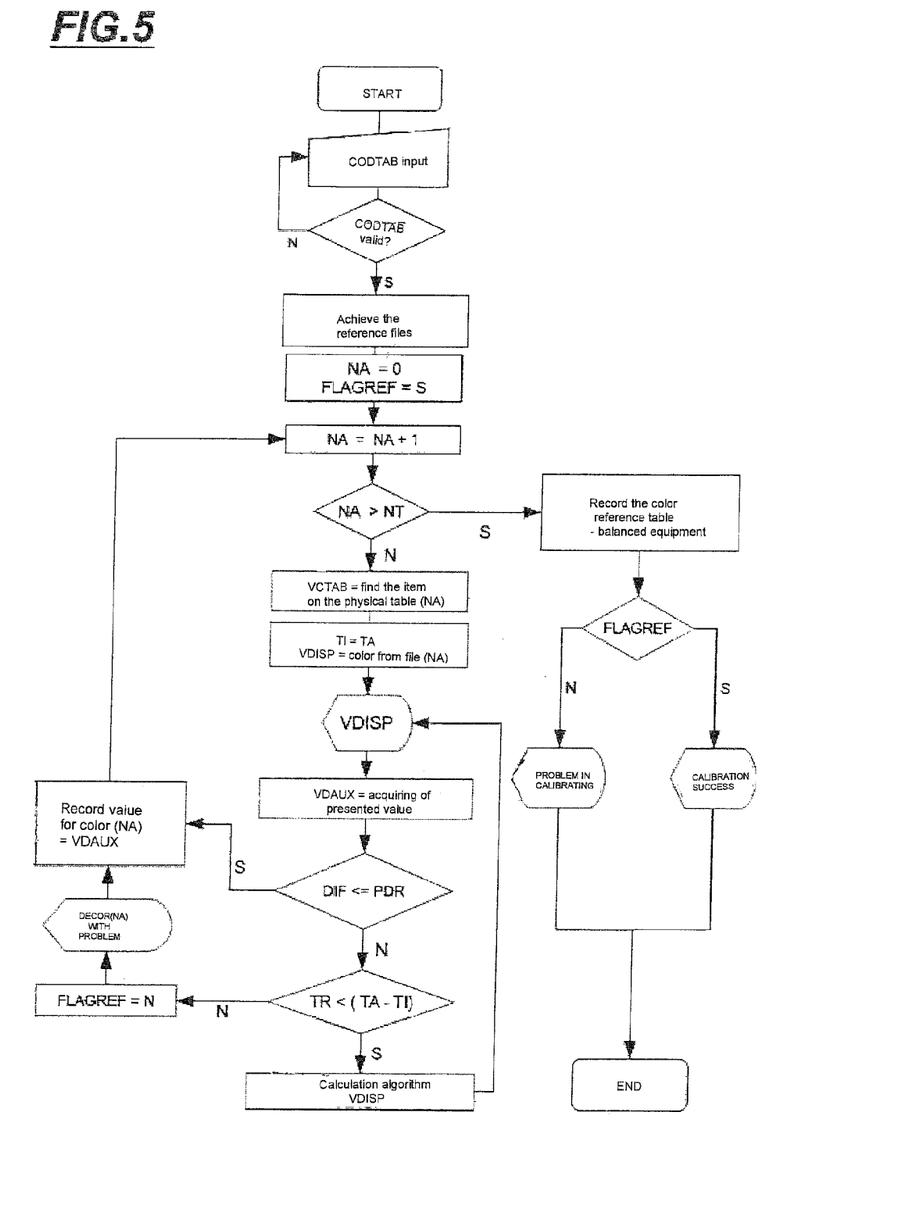
FIG. 5 is flow chart of an illustrative depiction of the routine performed by applicable software specific for calibrating the RGB color set in the image capture and output macro-system.

It will be understood by persons having ordinary skill in the art that the selection of a color combination, as for example by RGB pattern is made because this is the perception pattern of the human eye, and that other patterns of color sets (perceivable by other animals, such as dogs, cats, birds, among others) are applied to the present example too without departing from the novel scope of the present invention.

b. About the color perception through indirect vision: through FIG. 2 however, a macro-vision of the conventional architecture of perception of RGB color combination is shown, this time done in the "indirect vision" mode where the object (Ob) outputs a RGB color combination, named "natural combination" (C1). As seen in FIG. 2, an image is captured an image capturing device (Ca) such as a video or photographic camera, without limitation any manner of image capture technologies. In this condition the captured image presents a distorted RGB color set (C2), which is directly sent to an image output device (Mo), such as a video monitor, without any limitation any manner of presentation and technologies, which in turn outputs exactly this distorted RGB color set (C2) that will be the object of perception by the observer (Ho).

c. About the inventive activity: the invention is in pertinent part a solution for calibrating the color set in RGB pattern. In contrast to all the prior existing techniques for color management, which are exhaustively related in the literature and known to persons having ordinary skill in the art, the present invention is differentiated in terms of its flexibility, portability, agility, automation, reduced labor cost, and economically viable. It will be understood that these terms are the predicates to the invention being a feasible "real-time" correction/calibration system for the color spectrum. The invention is contained on an image output (transmitted), the operational viability of which is founded in a specific applicable software, having high logical complexity.

d. Macro-architecture of the inventive system: referring again to the drawings, the system (S) has an architecture revealed through FIG. 3, where it is shown as being comprised of the following operational blocks:

at least one physical reference (Re), which can be a color table that contains at least the following information: manufacturer, reference type, manufacturing date of the physical part, quantity of table items; desired accuracy value, where this reference (Re) can be read by the system (S) by means of such technologies as bars code, RFid, NFC, and Bluetooth among others, once having duly on-board elements for recognizing these technologies;

at least one physical reference-reading-device (Le): which captures all the information set for the certified reference (Re) from certifiers, for latter delivery to the applicable software (Sw), and then for color treating and calibrating. The calibration element being readable type sensors for bar codes, RFid, NFC, and Bluetooth technologies, among others;

at least one image capturing device (Ca), such as a (photographic or video) camera or otherwise, a sensor for determining colors compatible with the wavelengths generated or acquired for a certified valid reference of RGB colors. That is, it calibrates part of the image capture and output equipment;

a support hardware (Hw), with functions to provide operational support to the applicable software (Sw) and to the physical reference reading device (Le);

an applicable software (Sw), provided with a novel routine for correcting all the RGB color spectrum by means of the interpretation of data arising from the certified reference (Re) and from data from the color combination captured by the image capturing device (Ca) and output by the image output device (Mo);

at least one image output device (Mo), the RGB color set of which is the object of the calibration and matching with the colors defined by the certified reference (Re). It will be understood that the items and things noted and listed are by way of a preferred embodiment of the present invention and that substitutions can be made, by persons having ordinary skill in the art without departing from the novel scope of the present invention.

e. Operational logic of the inventive system: the inventive system, in the present embodiment, is divided into two distinct phases, namely PHASE 1 and PHASE 2 as described below. PHASE 1 subsists for calibrating the presentation equipment, or more specifically the exhibition display on-board of the image output device (Mo). PHASE 1 is shown in FIG. 4, and following the logic sequence of the following macro-steps:

Step 01: the system operator in possession of the physical reference reader (Le) captures all the information set for the certified reference (Re), more specifically the information about the previously defined color pattern;

Step 02: loading of the calibration system, where the applicable software (Sw) acquires the reference (Re) code, automatically or by typing it, or by other means known to persons having ordinary skill in the art, coming from the physical reference reader (Le);

Step 03: calibrating of the color set for an image, where once identified the certified reference (Re), defined at the physical table for instance, and in possession of the color comparison files for this reference, the applicable software (Sw) begins to run the calibration routine where the system (S) sends the first reference value to be shown, and by means of a sensor it has effected, a direct comparison of the first color of the natural combination (C1) output by the physical object (Ob) to the exhibited reference. This creates a comparative chart of the colors, one aside the other, in order that the program enters in an adjusting routine (where it might use one of the several known mathematical algorithms, such as Lagrange interpolation, Newton interpolation, and others known to persons having ordinary skill in the art). The utilization of the algorithm, which will be best applied to the existing applicable software (Sw), so that the routine is repeated until the calibrated RGB color set (Cr) which will be the same RGB color set shown (C4) at the image presented is achieved by the display of the image output device (Mo). The goal being that the calibrated RGB color set (Cr) will have an equal or superior quality than the required accuracy, that is, similar to the RGB color set naturally output (C1) by the object (Ob). This routine will be repeated for all items of colors existing in the physical reference (Re); FIG. 5, now shows the routine flow chart. Referring to FIG. 5, the following steps are detailed;

Step 04: storage of the calibrated RGB color set (Cr); and

Step 05: displaying of the calibrated RGB color set (Cr) through the monitor of the device (Mo).

After completion of the first phase, the system (S) begins the second phase, PHASE 2, for calibrating the image capturing device (Ca) such as, but not limited to, a camera, the understanding of which is disclosed in FIG. 4 and follows the logic sequence of macro-steps below:

Step 01: starting from the certified reference the image capturing device (Ca) attains the first color of the RGB color set defined at the certified reference table (Re);

Step 02: loading of the calibration system (S), where the applicable software (Sw) attains the first color of the RGB color set defined at the certified reference table (Re);

Step 03: calibrating of the color set for an image, where once identified the certified reference (Re) (which is in possession of the color comparison files for this reference), and provided to the applicable software (Sw), the software begins running the calibration routine. It will be seen that the system (S) sends the first reference value to be displayed and, by means of a sensor, is effected a direct comparison of the first color of the natural combination (C1) (output by the physical object (Ob)) to the displayed reference, creating a comparative chart of colors one aside the other. There follows an entering into a routine of adjustment (where it can be used one of the several mathematical algorithms, such as Lagrange interpolation, Newton interpolation, etc.), utilizing the algorithm that will be applied to the existing applicable software (Sw). This routine will be repeated until the point where the displayed RGB color set (C2), in the image presented on the image capturing device (Ca), will have an equal to or superior quality than the required accuracy. That is, an accuracy similar to the RGB color set (C1) naturally output by the object (Ob), having as reference the calibrated RGB color set (Cr) generated by the applicable software (Sw). This routine may be repeated for all the color items existing in the physical reference (Re); such that the same is in detail described by the routine flow chart shown at FIG. 5; and finally, Step 04: storage of the calibrated RFB color set.

f. Color calibrating running routine: in a preferred embodiment form of the calibration routine, both for the PHASE 1, calibration of the image output device (Mo), and PHASE 2, calibration of the image capturing device (Ca), as shown by the flow chart of FIG. 5, where the following acronyms of the involved variables are used:

CODTAB=reference code of the physical table of colors. (certified reference (Re));

NA=quantity of auxiliary items;

FLAGREF=binary flag—with the calibration status, compared values: Yes, No

NT=quantity of items at the certified reference table (RE);

VCTAB=Value of the achieved color with the reading of the color on the physical image;

VRC=Reference value for displaying of the physical color of the certified table that is the translation of the presentation file of the color image, which represents on the display of the referred system the temperature of the presented color as calculated by the manufacturer of the certified reference table (Re). The numerical value, achieved by an algorithm developed by the manufacturer;

TI=initial time;
TA=actual time;
VCE=Exhibition value of the color on the equipment;
VDISP=Value of the color presented on the display.
VDAUX=Acquisition of the value of the color presented on the display to be utilized in the comparison to the value achieved in the reading of the physical color from the comparison table. Calculation performed by the algorithm which is the color achieved by the following calculation;
DIF=MOD(VDAUX−VCTAB)=absolute value of the difference for comparison to the PDR;
PDR=desired accuracy for the reference;
TR=Maximum reference time for calibrating each item; and
DESCOR=color description.

g. Detailing of the calibration routine logic:

Step 01: it is assumed, as the beginning, the input of the reference code of colors (CODTAB), where the routine run the first checking conditional, where in if it is an invalid code the routine returns back to the start, in order that the calibration process will only begin when there is a valid reference code of colors (CODTAB);

Step 02: when the reference code of colors (CODTAB) is valid, the routine begins to acquire the reference files where the quantity of auxiliary items (NA) is equal to zero and the binary flag (FLAGREF) has the value "YES";

Step 03: the routine adds to the quantity of auxiliary items (NA)=0 an incremental value of a unity, where NA=NA+1;

Step 04: the routine performs a conditional checking routine, comparing the value of quantity of auxiliary items (NA) to the value of quantity of items of the table (NT). This phase of the routine is done to assure that the applicable software (Sw) will perform the calibration of the image output device (Mo) and/or the image capturing device (Ca), for all the items defined at the certified reference table (Re). Thus this routine will be repeated until the point where the value of the quantity of the auxiliary items (NA) will be more than the value of the quantity of items of the table (NT).

Step 05: at the beginning of the calibration, wherein for the quantity of an auxiliary items (NA) a value less than the quantity of items of the table (NT) value, the routine performs the localization of the value of the quantity of the auxiliary items (NA) at the physical reference table (Re). Where this value é, loaded in the variable VCTAB, represents the value of the achieved color (C2) with the color reading (C1) in the physical image of the object (Ob) (refer to FIG. 4). At this point of the routine, a timer is input, with variables (Ti) with initial time and (TA) with actual time, wherein this expedient is necessary for avoiding the event where the routine will enter in a loop;

Step 06: acquisition of the value of the color, presented on the display (VDISP) of the image output device (Mo), that must be equal to the value of the auxiliary item (NA);

Step 07: acquisition of the absolute value of the difference (DIF) for comparison to the value of the desired accuracy for the reference (PDR), where it is obtained by subtracting from the variable (VDAUX) from the variable (VCTAB);

Step 08: comparison of the color value presented on the display (VDISP) with the desired accuracy for the reference (PDR), where in case of (DIF) being more than (PDR) the routine returns back to step (6). The return to step (6) is limited by time too, by means of a subroutine defined by the variable of maximum reference time for the calibration of each item (TR) that must be more than the subtraction between the variable of actual time (TA) with the variable of initial time (TI). During this condition the routine finds a binary flag (FLAGRF) with negative value (N), indicating that the color description (DESCOR) for the value (NA) still presents a problem, converging to the recording step of the value of the color acquired on the display (VDISP). Nevertheless in this case (TR) will be lesser than (Ta)−(TI) and the value of the color presented on the display (VDISP) is recalculated, returning to step 06;

Step 09: recording of the value of the color acquired on the display (VDISP), when (DIF) is less than or equal to (PDR), the value of the auxiliary item (color) turns to be equal to the value of (VDAUX);

Step 10: the routine returns back to step 03, now with the new value of the auxiliary item (NA), that then receives again an incremental value of a unity, where NA=NA+1, restarting the calibration cycle; and Step 11: end of the calibration, where the value of the quantity of auxiliary items (NA) is more than the value of the quantity of items at the table (NT). The routine causes the image output device (Mo) and/or the image capturing device (Ca) to be calibrated having as a reference the certified reference table (Re); and Step 12: final checking, where once the color reference table of the calibrated devices is registered, a binary flag is turned on (FLAGREF), which shows the calibration status, where a positive signal (Yes) is indicative that the calibration was successful and a negative signal (No) is indicative that the calibration was unsuccessful.

The choice of the preferred form of realization of the object of the inventive object as disclosed in the below claims and described in the specification is given only for illustrative purposes only. Changes, modifications and variations can be realized for any other realization forms for the system (S) by those having ordinary skilled in the art without departing from the novel scope of the present invention.

Although an illustrative embodiment of the invention has been shown and described, it is to be understood that various modifications and substitutions may be made by those skilled in the art without departing from the novel spirit and scope of the invention.

What is claimed is:

1. A real-time correction/calibration system for the color spectrum, wherein the conventional architecture of a "direct vision" system is formed by an image capturing device (Ca) such as a video or photographic camera, the captured image of which presents a distorted RGB color set (C2) related to the natural combination (C1), output by the object (Ob) that is directly sent to an image output device (Mo), such as a video monitor, that exactly outputs this distorted RGB color set (C2) that is perceived by the observer (Ho), wherein the system (S) has the architecture characterized by the operational blocks:

at least one certified reference (Re) which is connected to at least one physical reference reading device (Le), which is connected to the image capturing device (Ca);

a support hardware (Hw) that supports the physical reference reading device (Le), and an applicable software (Sw) having a correcting routine for a RGB color spectrum, the correcting routine being connected to the image output device (Mo); and wherein the operational logic of the system (S) is characterized by a "phase 1", for calibrating the image output device (Mo) and a "phase 2" for calibrating the image capturing device (Ca); and wherein the "phase 1", for calibrating the image output device (Mo) is characterized by the following macro-steps:

Step 01: the operator of the calibration system (S) in possession of the physical reference reading device (Le) captures all the information set of the colors pattern for the certified reference (Re);

Step 02: loading of the calibration system (S), wherein the applicable software (Sw) attains the code for the certified reference (Re) automatically or by having it otherwise entered, coming from the physical reference reading device (Le);

Step 03: calibration of the colors set for an image, wherein the applicable software (Sw) loaded with the certified reference (Re) and respective files of color comparison, will run for each of the colors to be calibrated, the procedure including the steps of: sending the first reference value to be displayed, by means of a sensor it has effected, a direct comparison of the first color of the natural combination (C1) output by the physical object (Ob) to the displayed reference, running the color adjusting until the point where the calibrated RGB color set (Cr) will be attained like the displayed RGB color set (C4) defined on the image output device (Mo);

Step 04: storage of the calibrated RGB color set (Cr); and

Step 05: displaying of the calibrated RGB color set (Cr) through the display of the device monitor (Mo).

2. The real-time correction/calibration system for the color spectrum, according to claim 1, wherein running the color calibration both for phase 1 and phase 2 is characterized by the following steps:

Step 01: assuming as the start the input of the color reference code (CODTAB), wherein the routine run the first checking conditional, such that if it is an invalid code, the routine returns back to the start, such that the calibration process will only begin when there exists a valid color reference code (CODTAB);

Step 02: when there is a valid reference code (CODTAB), the routine attains the reference files, wherein the quantity of auxiliary items (NA) is equal to zero and a binary flag (FLAGREF) has value "Yes";

Step 03: adding to the quantity of auxiliary items (NA)=0 an incremental value of a unity, wherein NA=NA+1;

Step 04: comparing the value of a quantity of auxiliary items (NA) to the value of a quantity of table items (NT), repeating until the point where the value of quantity of auxiliary items (NA) is more than the value of quantity of table items (NT);

Step 05: starting the calibration, where for a value of quantity of auxiliary items (NA) less than the value of quantity of table items (NT), the routine runs the found value of quantity of auxiliary items (NA) at the physical reference table (Re), wherein this value is loaded at the variable (VCTAB), that subsequently represents the value of the color achieved (C2) with the color reading (C1) on the physical image of the object (Ob), there being a timer, with variables initial time (TI) and actual time (TA);

Step 06: acquisition of the value of the color presented on the display (VDISP) of the image output device (Mo), that must be equal to the auxiliary item (NA);

Step 07: acquisition of the absolute value of the difference (DIF) for the comparison with the desired accuracy value to the reference (PDR), wherein this is achieved by subtracting variable (VCTAB) from variable (VDAUX);

Step 08: comparing the value of the color presented on the display (VDISP) with the desired accuracy to the reference (PDR), where if (DIF) is more than (PDR) the routine returns back to step (6), such that this return is also limited by time by means of the reference maximum time variable for the calibration of each item (TR) that must be more than the subtraction between the actual time (TA) and the initial time variable (TI), where while the binary flag (FLAGREF) is presenting a negative value (N), it indicates that the color description (DESCOR) for the value (NA) is not calibrated, converging this step to the recording of the acquired color on the display (VDISP), such that in case (TR) will be less than (TA)–(TI) the value of the color presented on the display (VDISP) is recalculated, returning back to step 06;

Step 09: recording the value of the color acquired on the display (VDISP), when (DIF) will be less than or equal to (PDR), the value of the auxiliary (NA) item (color) turns to be equal to the value of (VDAUX);

Step 10: returning back to step 03, with the value of the auxiliary item (NA), that subsequently receives an incremental value of a unit, where NA=NA+1, restarting the calibration cycle; and Step 11: ending the calibration when the value of the quantity of auxiliary items (NA) is more than the value of the quantity of table items (NT), such that the image output device (Mo) and/or the image capturing device (Ca) is calibrated;

Step 12: final checking, where once recorded the color reference table of the calibrated devices, a binary flag (FLAGREF) is turned on, showing the calibration status, which is a positive signal (Yes) indicative that the calibration was successful and is a negative signal (No) indicative that the calibration was unsuccessful.

3. A real-time correction/calibration system for the color spectrum, wherein the conventional architecture of a "direct vision" system is formed by an image capturing device (Ca) such as a video or photographic camera, the captured image of which presents a distorted RGB color set (C2) related to the natural combination (C1), output by the object (Ob) that is directly sent to an image output device (Mo), such as a video monitor, that exactly outputs this distorted RGB color set (C2) that is perceived by the observer (Ho), wherein the system (S) has the architecture characterized by the operational blocks:

at least one certified reference (Re) which is connected to at least one physical reference reading device (Le), which is connected to the image capturing device (Ca);

a support hardware (Hw) that supports the physical reference reading device (Le), and an applicable software (Sw) having a correcting routine for a RGB color spectrum, the correcting routine being connected to the image output device (Mo); and wherein the operational logic of the system (S) is characterized by a "phase 1", for calibrating the image output device (Mo) and a "phase 2" for calibrating the image capturing device (Ca); and wherein the "phase 2", for calibrating the image capturing device (Ca) is characterized by the following macrosteps:

Step 01: beginning from the certified reference (Re) the image capturing device (Ca) attains the first color of the RGB color set defined at the physical reference table (Re);

Step 02: loading of the calibration system (S), wherein the applicable software (Sw) attains a first color from the RGB color set defined at the certified reference table (Re);

Step 03: calibrating of the color set for an image, wherein the applicable software (Sw) loaded with the certified reference (Re) and respective color comparison files, will run, for each of the colors to be calibrated, the procedure for sending the first reference value to be displayed, and by means of a sensor it is effected, a direct comparison of the first color from the natural combination (C1), output by the physical object (Ob), to the displayed reference color, running the color adjusting scheme until the point where the displayed RGB color set (C2) in the image displayed on the image capturing device (Ca) will have a quality equal or superior to the RGB color set (C1) output by the object (Ob); and Step 04: storage of the calibrated RGB color set.

4. The real-time correction/calibration system for the color spectrum, according to claim 3, wherein running the color calibration both for phase 1 and phase 2 is characterized by the following steps:

Step 01: assuming as the start the input of the color reference code (CODTAB), wherein the routine run the first checking conditional, such that if it is an invalid code, the routine returns back to the start, such that the calibration process will only begin when there exists a valid color reference code (CODTAB);

Step 02: when there is a valid reference code (CODTAB), the routine attains the reference files, wherein the quantity of auxiliary items (NA) is equal to zero and a binary flag (FLAGREF) has value "Yes";

Step 03: adding to the quantity of auxiliary items (NA)=0 an incremental value of a unity, wherein NA=NA+1;

Step 04: comparing the value of a quantity of auxiliary items (NA) to the value of a quantity of table items (NT), repeating until the point where the value of quantity of auxiliary items (NA) is more than the value of quantity of table items (NT);

Step 05: starting the calibration, where for a value of quantity of auxiliary items (NA) less than the value of quantity of table items (NT), the routine runs the found value of quantity of auxiliary items (NA) at the physical reference table (Re), wherein this value is loaded at the variable (VCTAB), that subsequently represents the value of the color achieved (C2) with the color reading (C1) on the physical image of the object (Ob), there being a timer, with variables initial time (TI) and actual time (TA);

Step 06: acquisition of the value of the color presented on the display (VDISP) of the image output device (Mo), that must be equal to the auxiliary item (NA);

Step 07: acquisition of the absolute value of the difference (DIF) for the comparison with the desired accuracy value to the reference (PDR), wherein this is achieved by subtracting variable (VCTAB) from variable (VDAUX);

Step 08: comparing the value of the color presented on the display (VDISP) with the desired accuracy to the reference (PDR), where if (DIF) is more than (PDR) the routine returns back to step (6), such that this return is also limited by time by means of the reference maximum time variable for the calibration of each item (TR) that must be more than the subtraction between the actual time (TA) and the initial time variable (TI), where while the binary flag (FLAGREF) is presenting a negative value (N), it indicates that the color description (DESCOR) for the value (NA) is not calibrated, converging this step to the recording of the acquired color on the display (VDISP), such that in case (TR) will be less than (TA)−(TI) the value of the color presented on the display (VDISP) is recalculated, returning back to step 06;

Step 09: recording the value of the color acquired on the display (VDISP), when (DIF) will be less than or equal to (PDR), the value of the auxiliary (NA) item (color) turns to be equal to the value of (VDAUX);

Step 10: returning back to step 03, with the value of the auxiliary item (NA), that subsequently receives an incremental value of a unit, where NA=NA+1, restarting the calibration cycle; and Step 11: ending the calibration when the value of the quantity of auxiliary items (NA) is more than the value of the quantity of table items (NT), such that the image output device (Mo) and/or the image capturing device (Ca) is calibrated;

Step 12: final checking, where once recorded the color reference table of the calibrated devices, a binary flag (FLAGREF) is turned on, showing the calibration status, which is a positive signal (Yes) indicative that the calibration was successful and is a negative signal (No) indicative that the calibration was unsuccessful.

5. A real-time correction/calibration system for the color spectrum, wherein the conventional architecture of a "direct vision" system is formed by an image capturing device (Ca) such as a video or photographic camera, the captured image of which presents a distorted RGB color set (C2) related to the natural combination (C1), output by the object (Ob) that is directly sent to an image output device (Mo), such as a video monitor, that exactly outputs this distorted RGB color set (C2) that is perceived by the observer (Ho), wherein the system (S) has the architecture characterized by the operational blocks:

at least one certified reference (Re) which is connected to at least one physical reference reading device (Le), which is connected to the image capturing device (Ca);

a support hardware (Hw) that supports the physical reference reading device (Le), and an applicable software (Sw) having a correcting routine for a RGB color spectrum, the correcting routine being connected to the image output device (Mo); and wherein the operational logic of the system (S) is characterized by a "phase 1", for calibrating the image output device (Mo) and a "phase 2" for calibrating the image capturing device (Ca); and wherein the "phase 1", for calibrating the image output device (Mo) is characterized by the following macro-steps:

Step 01: the operator of the calibration system (S) in possession of the physical reference reading device (Le) captures all the information set of the colors pattern for the certified reference (Re);

Step 02: loading of the calibration system (S), wherein the applicable software (Sw) attains the code for the certified reference (Re) automatically or by having it otherwise entered, coming from the physical reference reading device (Le);

Step 03: calibration of the colors set for an image, wherein the applicable software (Sw) loaded with the certified reference (Re) and respective files of color comparison, will run for each of the colors to be calibrated, the procedure including the steps of: sending the first reference value to be displayed, by means of a sensor it has effected, a direct comparison of the first color of the natural combination (C1) output by the physical object (Ob) to the displayed reference, running the color adjusting until the point where the calibrated RGB color set (Cr) will be attained like the displayed RGB color set (C4) defined on the image output device (Mo);

Step 04: storage of the calibrated RGB color set (Cr); and

Step 05: displaying of the calibrated RGB color set (Cr) through the display of the device monitor (Mo).

6. The real-time correction/calibration system for the color spectrum, according to claim 5, wherein running the color calibration both for phase 1 and phase 2 is characterized by the following steps:

Step 01: assuming as the start the input of the color reference code (CODTAB), wherein the routine run the first checking conditional, such that if it is an invalid code, the routine returns back to the start, such that the calibration process will only begin when there exists a valid color reference code (CODTAB);

Step 02: when there is a valid reference code (CODTAB), the routine attains the reference files, wherein the quantity of auxiliary items (NA) is equal to zero and a binary flag (FLAGREF) has value "Yes";

Step 03: adding to the quantity of auxiliary items (NA)=0 an incremental value of a unity, wherein NA=NA+1;

Step 04: comparing the value of a quantity of auxiliary items (NA) to the value of a quantity of table items (NT), repeating until the point where the value of quantity of auxiliary items (NA) is more than the value of quantity of table items (NT);

Step 05: starting the calibration, where for a value of quantity of auxiliary items (NA) less than the value of quantity of table items (NT), the routine runs the found value of quantity of auxiliary items (NA) at the physical reference table (Re), wherein this value is loaded at the variable (VCTAB), that subsequently represents the value of the color achieved (C2) with the color reading (C1) on the physical image of the object (Ob), there being a timer, with variables initial time (TI) and actual time (TA);

Step 06: acquisition of the value of the color presented on the display (VDISP) of the image output device (Mo), that must be equal to the auxiliary item (NA);

Step 07: acquisition of the absolute value of the difference (DIF) for the comparison with the desired accuracy value to the reference (PDR), wherein this is achieved by subtracting variable (VCTAB) from variable (VDAUX);

Step 08: comparing the value of the color presented on the display (VDISP) with the desired accuracy to the reference (PDR), where if (DIF) is more than (PDR) the routine returns back to step (6), such that this return is also limited by time by means of the reference maximum time variable for the calibration of each item (TR) that must be more than the subtraction between the actual time (TA) and the initial time variable (TI), where while the binary flag (FLAGREF) is presenting a negative value (N), it indicates that the color description (DESCOR) for the value (NA) is not calibrated, converging this step to the recording of the acquired color on the display (VDISP), such that in case (TR) will be less than (TA)−(TI) the value of the color presented on the display (VDISP) is recalculated, returning back to step 06;

Step 09: recording the value of the color acquired on the display (VDISP), when (DIF) will be less than or equal to (PDR), the value of the auxiliary (NA) item (color) turns to be equal to the value of (VDAUX);

Step 10: returning back to step 03, with the value of the auxiliary item (NA), that subsequently receives an incremental value of a unit, where NA=NA+1, restarting the calibration cycle; and Step 11: ending the calibration when the value of the quantity of auxiliary items (NA) is more than the value of the quantity of table items (NT), such that the image output device (Mo) and/or the image capturing device (Ca) is calibrated;

Step 12: final checking, where once recorded the color reference table of the calibrated devices, a binary flag (FLAGREF) is turned on, showing the calibration status, which is a positive signal (Yes) indicative that the calibration was successful and is a negative signal (No) indicative that the calibration was unsuccessful.

7. A real-time correction/calibration system for the color spectrum, wherein the conventional architecture of a "indirect vision" system is formed by an image capturing device (Ca) such as a video or photographic camera, the captured image of which presents a distorted RGB color set (C2) related to the natural combination (C1), output by the object (Ob) that is directly sent to an image output device (Mo), such as a video monitor, that exactly outputs this distorted RGB color set (C2) that is perceived by the observer (Ho), wherein the system (S) has the architecture characterized by the operational blocks:

at least one certified reference (Re) which is connected to at least one physical reference reading device (Le), which is connected to the image capturing device (Ca);

a support hardware (Hw) that supports the physical reference reading device (Le), and an applicable software (Sw) having a correcting routine for a RGB color spectrum, the correcting routine being connected to the image output device (Mo); and wherein the operational logic of the system (S) is characterized by a "phase 1", for calibrating the image output device (Mo) and a "phase 2" for calibrating the image capturing device (Ca): and wherein the "phase 2", for calibrating the image capturing device (Ca) is characterized by the following macrosteps:

Step 01: beginning from the certified reference (Re) the image capturing device (Ca) attains the first color of the RGB color set defined at the physical reference table (Re);

Step 02: loading of the calibration system (S), wherein the applicable software (Sw) attains a first color from the RGB color set defined at the certified reference table (Re);

Step 03: calibrating of the color set for an image, wherein the applicable software (Sw) loaded with the certified reference (Re) and respective color comparison files, will run, for each of the colors to be calibrated, the procedure for sending the first reference value to be displayed, and by means of a sensor it is effected, a direct comparison of the first color from the natural combination (C1), output by the physical object (Ob), to the displayed reference color, running the color adjusting scheme until the point where the displayed RGB color set (C2) in the image displayed on the image capturing device (Ca) will have a quality equal or superior to the RGB color set (C1) output by the object (Ob); and Step 04: storage of the calibrated RGB color set.

* * * * *